(12) United States Patent
Heberling, II

(10) Patent No.: US 11,408,525 B2
(45) Date of Patent: Aug. 9, 2022

(54) PRESSURE RELIEF VALVE FOR INFLATABLE STRUCTURES AND BOATS

(71) Applicant: Peter Stephen Heberling, II, Jacksonville, FL (US)

(72) Inventor: Peter Stephen Heberling, II, Jacksonville, FL (US)

( * ) Notice: Subject to any disclaimer, the term of this patent is extended or adjusted under 35 U.S.C. 154(b) by 143 days.

(21) Appl. No.: 16/846,100

(22) Filed: Apr. 10, 2020

(65) Prior Publication Data
US 2021/0317923 A1    Oct. 14, 2021

(51) Int. Cl.
*F16K 17/06* (2006.01)
*B63B 7/08* (2020.01)

(52) U.S. Cl.
CPC ............. *F16K 17/06* (2013.01); *B63B 7/08* (2013.01); *Y10T 137/36* (2015.04); *Y10T 137/3646* (2015.04); *Y10T 137/7841* (2015.04); *Y10T 137/7924* (2015.04)

(58) Field of Classification Search
CPC .......... Y10T 137/36; Y10T 137/3646; Y10T 137/7841; Y10T 137/7924; F16K 17/06; B63B 7/08
See application file for complete search history.

(56) References Cited

U.S. PATENT DOCUMENTS

| | | | | |
|---|---|---|---|---|
| 1,335,976 A * | 4/1920 | Leach | ................. | B60C 23/0496 137/226 |
| 1,369,343 A * | 2/1921 | Lamb | ...................... | F16K 15/20 137/226 |
| 1,403,006 A * | 1/1922 | Brakeman | ............ | B60C 23/0496 137/226 |
| 1,408,012 A * | 2/1922 | Loy | ...................... | B60C 23/0496 137/227 |
| 1,428,502 A * | 9/1922 | Hansen | ................ | B60C 23/0496 285/356 |
| 1,434,708 A * | 11/1922 | Kelsey | ................ | B60C 23/0496 137/226 |
| 1,454,409 A * | 5/1923 | Richter | .................... | G01L 17/00 137/538 |
| 1,530,112 A * | 3/1925 | Densmore | ............ | B65D 47/242 239/572 |
| 1,769,240 A * | 7/1930 | Smith | ...................... | B60S 5/043 137/551 |
| 1,862,403 A * | 6/1932 | Oraw | ...................... | G05D 16/10 251/366 |
| 1,882,215 A * | 10/1932 | Ewald | ...................... | B60S 5/043 137/614.19 |
| 1,939,249 A * | 12/1933 | Berger | ..................... | F16K 15/20 137/224 |
| 2,015,882 A * | 10/1935 | Brewer | ................... | B60C 23/00 137/506 |
| 2,254,655 A * | 9/1941 | Hollowell | ............... | F16K 15/20 137/493.9 |

(Continued)

*Primary Examiner* — Craig M Schneider
*Assistant Examiner* — Frederick D Soski
(74) *Attorney, Agent, or Firm* — Steven R. Scott

(57) ABSTRACT

This invention is a new and novel embodiment of inflation valve for an inflatable boat or article, which also incorporates a separate and internal pressure release valve to allow the release of air when needed due to the rise of internal pressure inside said boat caused by temperature changes during the day, or any other over-pressure situation which could cause a rupture of the seams or outer shell.

8 Claims, 9 Drawing Sheets

(56) References Cited

U.S. PATENT DOCUMENTS

| | | | | |
|---|---|---|---|---|
| 2,274,308 A | * | 2/1942 | Tschanz | F16K 11/04 137/506 |
| 2,286,841 A | * | 6/1942 | Smith | F16K 15/044 137/539 |
| 2,393,589 A | * | 1/1946 | Compton | F16K 17/18 137/493.6 |
| 2,501,801 A | * | 3/1950 | Wallin | B60C 23/0496 137/224 |
| 2,510,192 A | * | 6/1950 | Payne | F16K 15/207 137/226 |
| 2,517,917 A | * | 8/1950 | Payne | B60C 29/06 137/226 |
| 2,593,423 A | * | 4/1952 | Eastman | F16K 17/168 137/226 |
| 2,606,570 A | * | 8/1952 | Buenik | F16K 15/20 137/226 |
| 2,623,540 A | * | 12/1952 | Palermo | F16K 15/026 137/515.5 |
| 2,634,784 A | * | 4/1953 | Fitch | B60C 23/00318 137/224 |
| 2,672,153 A | * | 3/1954 | Kipp | F16K 15/20 137/232 |
| 2,690,757 A | * | 10/1954 | Orchowski | F16K 15/20 137/493.6 |
| 2,710,039 A | * | 6/1955 | Glenn | F16K 17/087 152/418 |
| 2,756,106 A | * | 7/1956 | Schenk | F02M 61/08 239/453 |
| 3,003,636 A | * | 10/1961 | Schrader | C02F 1/42 210/138 |
| 3,039,699 A | * | 6/1962 | Allen | F02M 61/047 239/602 |
| 3,043,333 A | * | 7/1962 | Kugler | F04B 53/105 137/506 |
| 3,289,686 A | * | 12/1966 | Tyler, Jr. | F16K 17/003 137/74 |
| 3,331,389 A | * | 7/1967 | Kirk | F16K 17/30 137/516.11 |
| 3,336,934 A | * | 8/1967 | Clements | G05D 16/0655 137/115.15 |
| 3,336,942 A | * | 8/1967 | Keith | F16K 15/026 267/179 |
| 3,419,113 A | * | 12/1968 | Shelley | B66C 23/92 137/512.2 |
| 3,450,147 A | * | 6/1969 | Webb | B60C 23/0496 137/230 |
| 3,454,033 A | * | 7/1969 | Smith | F16K 15/207 137/493.6 |
| 3,479,999 A | * | 11/1969 | Keller | F02M 59/462 137/512.2 |
| 3,537,469 A | * | 11/1970 | Hagar | B60C 23/0496 137/224 |
| 4,445,527 A | * | 5/1984 | Leimbach | B60C 23/0496 137/232 |
| 4,470,428 A | * | 9/1984 | Bishop | F04B 49/02 137/115.15 |
| 4,648,369 A | * | 3/1987 | Wannenwetsch | F02M 59/462 123/506 |
| 4,827,972 A | * | 5/1989 | Graham | F16K 11/105 251/284 |
| 4,895,199 A | * | 1/1990 | Magnuson | B60C 23/003 137/224 |
| 5,054,511 A | * | 10/1991 | Tuan | B60C 23/0496 137/224 |
| 5,141,589 A | * | 8/1992 | Mittal | B60C 23/00372 137/224 |
| 5,181,977 A | * | 1/1993 | Gneiding | B60C 29/06 137/224 |
| 5,778,925 A | * | 7/1998 | Cooke | F02M 55/02 137/493.9 |
| 5,839,488 A | * | 11/1998 | Peters | B60P 7/065 137/224 |
| 6,053,222 A | * | 4/2000 | Peters | B60P 7/065 137/625.68 |
| 6,079,519 A | * | 6/2000 | Lottes | F16N 21/04 137/512.2 |
| 6,293,297 B1 | * | 9/2001 | Maldonado | B60C 23/0496 137/227 |
| 7,028,708 B1 | * | 4/2006 | Langenfeld | F16K 17/18 137/513.5 |
| 7,073,527 B1 | * | 7/2006 | Freire Teiga | F16K 17/18 137/228 |
| 7,296,594 B1 | * | 11/2007 | Phanco | F16K 15/025 137/512.2 |
| 7,624,752 B2 | * | 12/2009 | Huang | F16K 15/207 137/228 |
| 2005/0178437 A1 | * | 8/2005 | Schultz | B60C 29/06 137/224 |
| 2007/0023083 A1 | * | 2/2007 | Huang | F16K 15/026 137/226 |
| 2010/0282333 A1 | * | 11/2010 | Newman | F16K 17/168 137/115.18 |
| 2017/0307094 A1 | * | 10/2017 | Choate | F16K 17/06 |
| 2022/0010885 A1 | * | 1/2022 | Mezzino | F16K 17/30 |

\* cited by examiner

SECTION 1-1

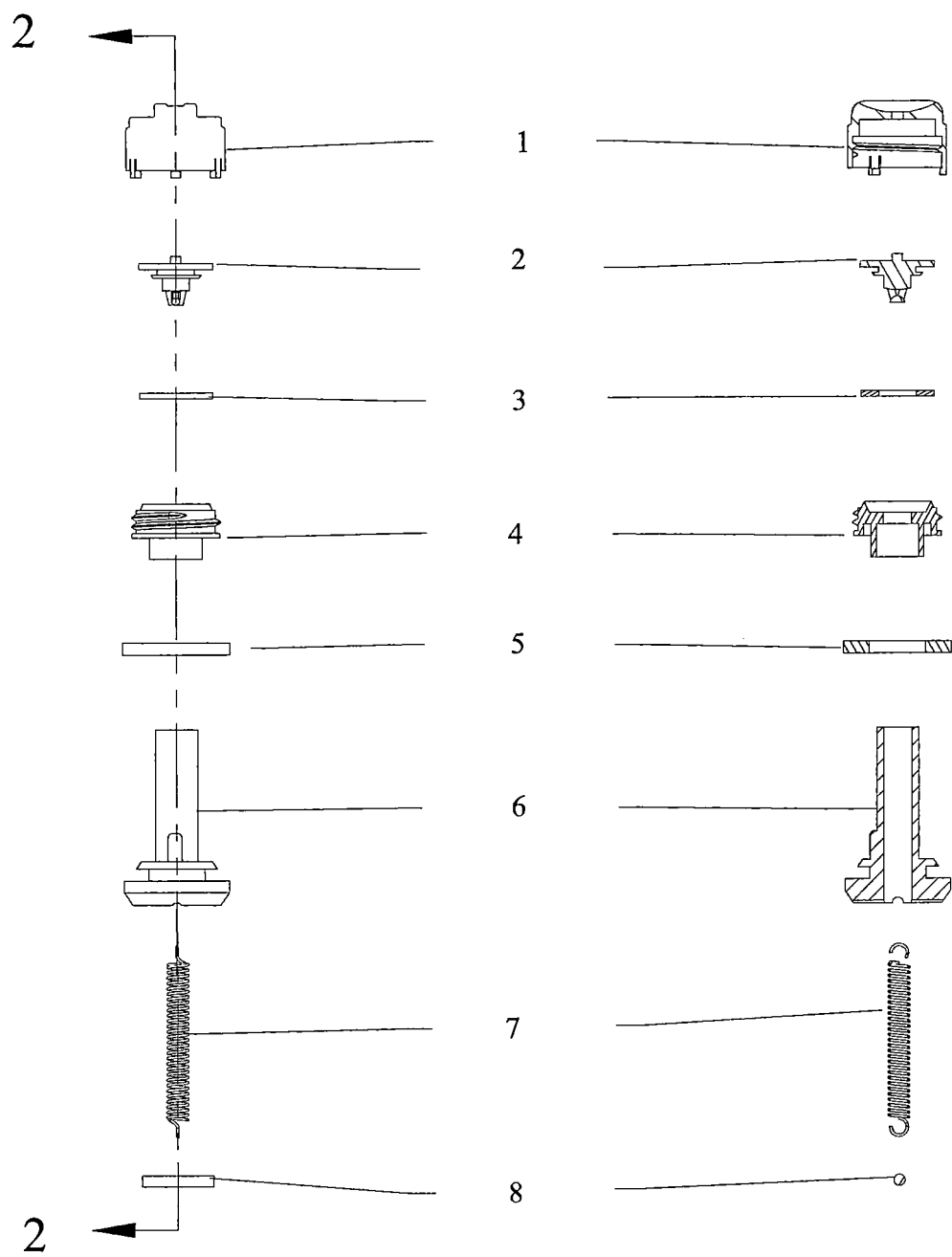
*FIG. 10*  *FIG. 11*
SECTION 2-2

SECTION 3-3

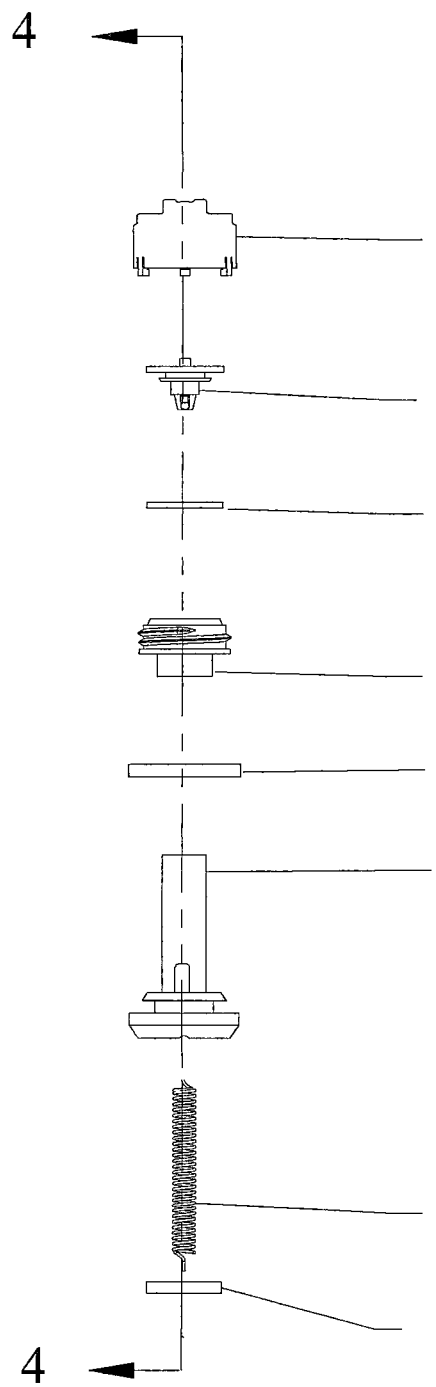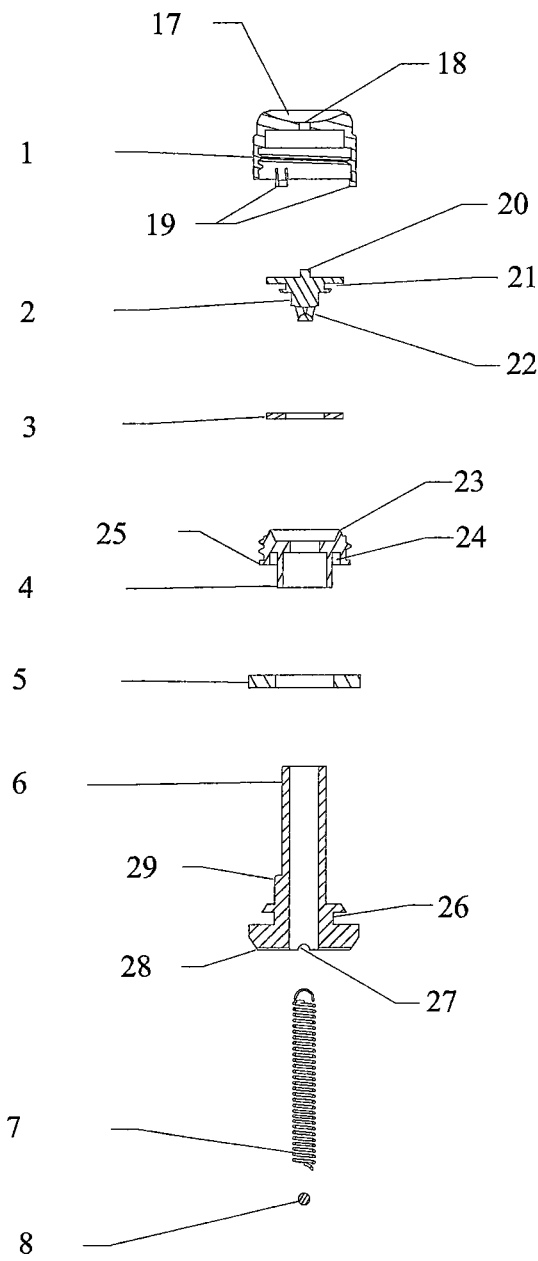
FIG. 15
FIG. 16
SECTION 4-4

SECTION 5-5

SECTION 6-6

PRESSURE RELIEF VALVE FOR INFLATABLE STRUCTURES AND BOATS

CROSS-REFERENCE TO RELATED APPLICATIONS

This application claims the benefit and priority of U.S. Provisional Application Ser. No. 62/832,095 titled "PRESSURE RELIEF VALVE FOR INFLATABLE STRUCTURES AND BOATS" 10 Apr. 2019, the same being incorporated herein by reference.

BACKGROUND OF THE INVENTION

Field of the Invention

The instant invention pertains to a new and novel type of pressure relief valve used in an inflatable boat or inflatable article that allows for the release of gas caused by a over pressure situation related to rising temperature over time and/or conditions in typical use. These situations may cause inflatable boat or inflated article outer skin to rupture from pressure increases whatever the cause.

Description of the Prior Art

There are various types and manufacturers of air valves and relief valves utilized in the manufacture and use of inflatable boats or inflatable articles. Most all pressure relief valves utilize either a flexible diaphragm or rigid type valve using spring closure to allow the escape of gas when needed to lower the pressure inside of the inflatable boat so no damage will occur from pressure fluctuations caused by rising temperature throughout the day Some of these pressure relief valves are individually mounted to the skin of the boat while others are incorporated into the same housing/body of the air valve used to inflate and/or deflate the boat. However, all of these designs use two separate valve bodies to accomplish each individual function separately, These valves incorporate one separate valve and/or body for inflation and one separate valve and/or body for the pressure relief function.

Background Information

Inflatable boats generally use a rubber covered reinforced fabric to allow for air holding and which also provides the needed shape of said boat. There are many manufacturers and different types and styles of inflatable boats, but all share similar attributes in their design and construction. The most common way to construct these types of craft are to use glued or welded seams throughout. This facilitates the different shapes that can be incorporated depending on specific design and end use. There are also many other products made this way and incorporate similar construction techniques and attributes including life rafts, inflatable fenders, and river rafts of various sizes and design/shapes.

These inflatable boats use many different types and styles of inflation valves for air holding, and some of these valves also allow for deflation with a shop type vacuum for stowage aboard mother vessel or storage elsewhere. Some inflation valve structures may also include a separate relief valve to facilitate release of gas for protection against over pressure which would lead to damage of the outer fabric or a rupture along a glued or welded seam(similar to and best described in U.S. Pat. No. 7,275,494). Still others use two separate and individually mounted valves to accomplish the same attributes(similar to and best described in U.S. Pat. No. 4,478,587). Most all of these valve designs, whether used for inflation and/or pressure relief usually have the same mounting style which is accomplished by an outer body which threads or screws to some type of nut that is used to tighten and hold tight the valve structure to said boat or article. This mounting also provides an air tight seal between the attached air valve body or pressure relief assembly and the outer fabric shell. Other types of these valves are attached by welding or gluing to the outer shell, but must share the attribute of an air tight attachment to the outer fabric shell.

SUMMARY OF THE INVENTION

The present invention allows for both inflation and pressure relief with a novel approach which incorporates both embodiments using a multiple valve system assembly inside one valve body. These embodiments are accomplished by placing the relief valve inside the inflation valve so that one air valve incorporates both embodiments and functions in only one multiple valve body assembly. This allows one valve system body and/or included nut to penetrate and attach to the outer fabric skin of boat or inflatable article. This is desired for simplicity and to allow only one penetration of outer skin or rubberized fabric but incorporate both embodiments of this pressure relief valve system.

This combination of inflation and pressure relief valve is incorporated inside the air valve body. This air valve incorporating an inner pressure relief valve uses spring force to create an air tight seal between the air valve and main body with a bodily held elastomer washer after insertion of required parts and subsequently welding on the appropriate body or cap. This air valve body is what holds the air inside said boat or article, but also incorporates the pressure relief valve function inside this same air valve body. Inside this pressure relief valve assembly is the pressure relief valve which allows release of gas from inside the boat or inflated article whenever needed due to over pressure of boat or article whatever the cause.

BRIEF DESCRIPTION OF THE DRAWINGS

FIG. 10 provides a expanded side schematic view of PR Valve Assembly from FIGS. 6 thorough 9 showing individual parts labeled 1 through 8.

FIG. 11 provides an expanded side sectional schematic view showing individual parts of PR Valve Assembly through Line 2-2 in FIG. 10.

FIG. 15 provides an expanded side schematic view of PR Valve Assembly from FIGS. 6 through 11, FIG. 16 provides an expanded side sectional view of PR Valve Assembly through line 4-4 from FIG. 15 with individual parts labeled 1 through 8, and features of these parts labeled 17 through 29.

DETAILED DESCRIPTION OF THE INVENTION

Figure 1:
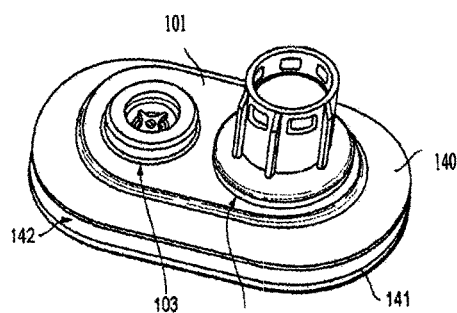
FIG. 1 provides a lower perspective view of a typical inflatable boat air valve with individual inflation and pressure relief valves attached to the same body.
Figure 2:
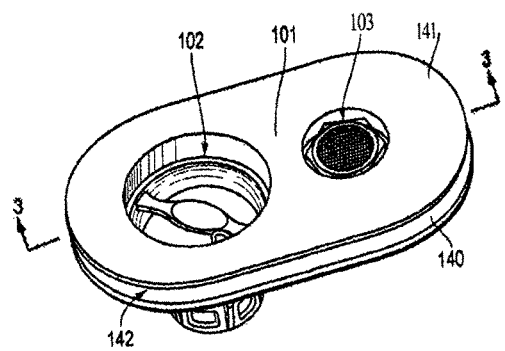
FIG. 2 provides a upper perspective view of valves and body from FIG. 1.
Figure 3:
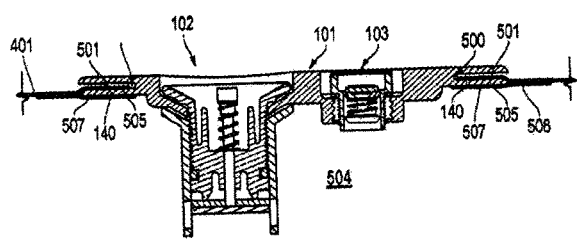
FIG. 3 provides a side sectional view of valves and body from FIGS. 1 and 2.
Figure 4:
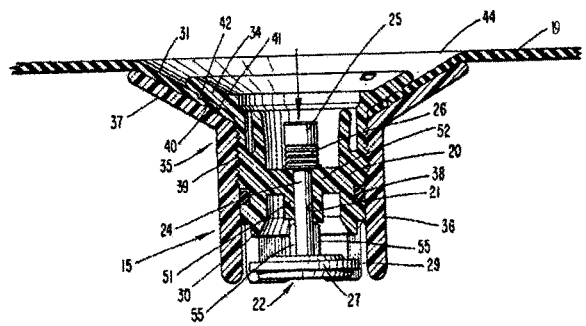
FIG. 4 provides a side section view of typical individual air valve assembly.
Figure 5:
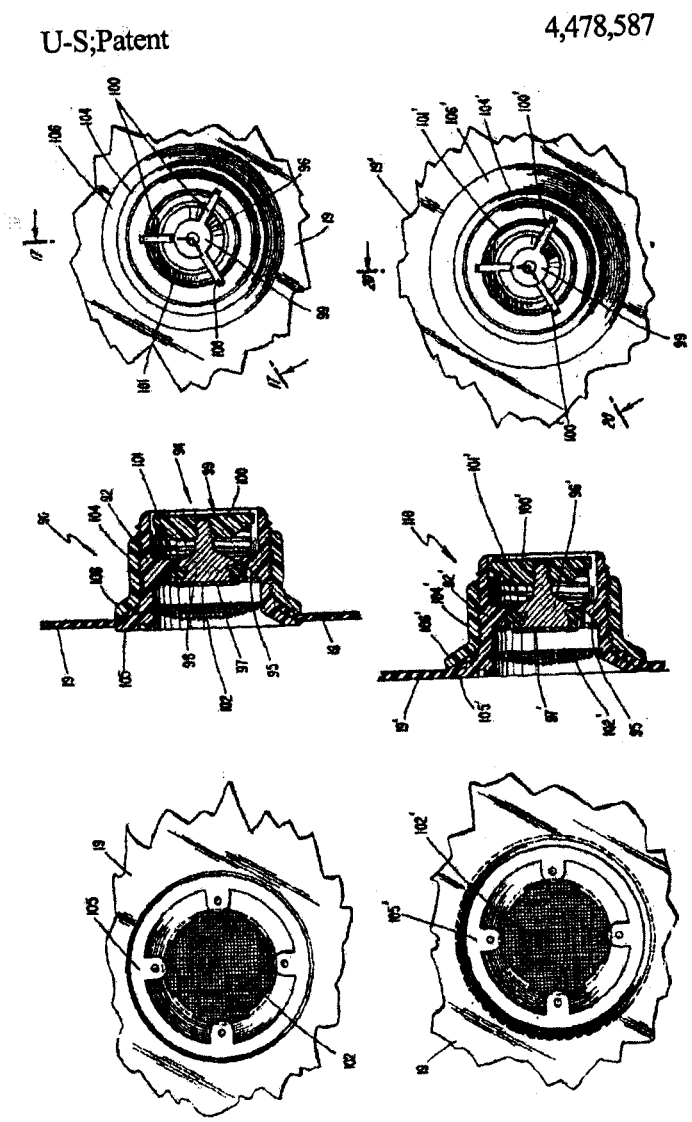
FIG. 5 provides multiple views of a typical individual pressure relief valve assembly.
Figure 6:
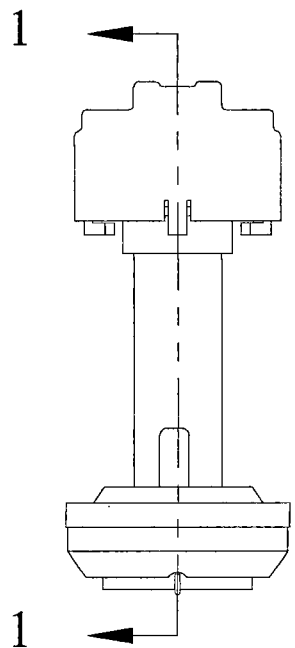
FIG. 6 provides a side view of the Tension Pressure Relief Valve Assembly.
Figure 7:
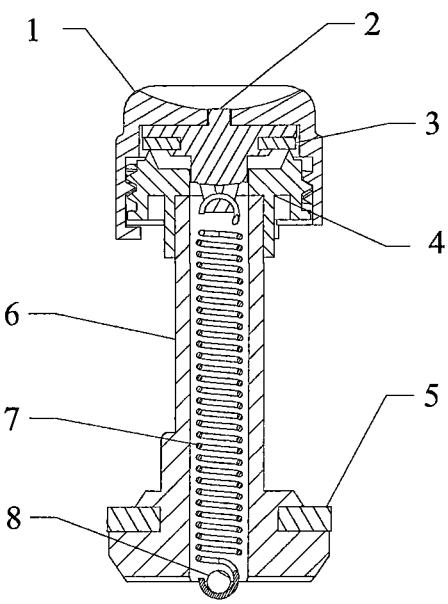
FIG. 7 provides a side sectional view through Line 1-1 in FIG. 6 showing the preferred embodiment of this invention with the individual parts of Pressure Release Valve Assembly labeled 1 through 8.
Figure 8:
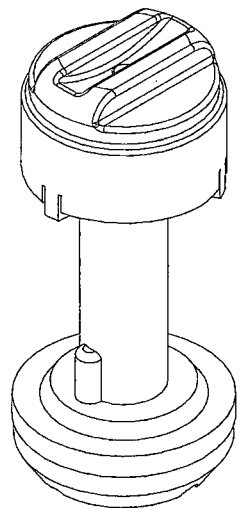
FIG. 8 provides an upper isometric view of PR Valve Assembly from FIGS. 6 and 7.
Figure 9:
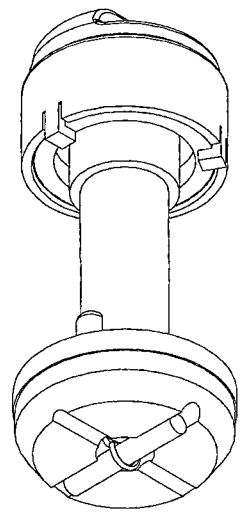
FIG. 9 provides a lower isometric view of PR Valve Assembly in FIGS. 6 through 8.
Figure 12:
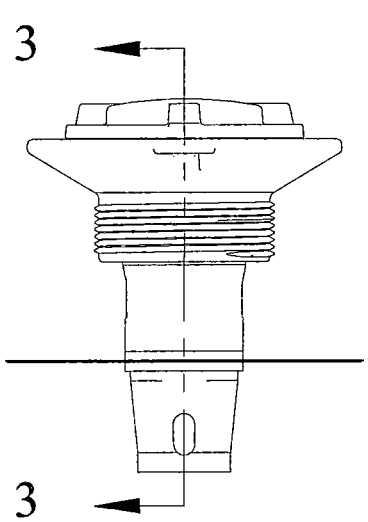
FIG. 12 provides a side view of an embodiment of valve system assembly including PR Valve Assembly featured within.

FIGS. 6 through 11, 13, and 15 through 20 show the preferred embodiment of this combined inflation air valve and internally mounted pressure relief valve. FIG. 7 provides the view of preferred embodiment of this invention with individual parts labeled 1 through 8. This embodiment of instant invention uses an Extension Spring 7 incorporating a tension force upon Valve Body 2 including attached Elastomer Washer 3. This Extension Spring 7 creates the required sealing force between this Valve Body 2 with attached Elastomer Washer 3, and the Upper Body 4 with inverted V feature 23 when in use.

Figure 13:
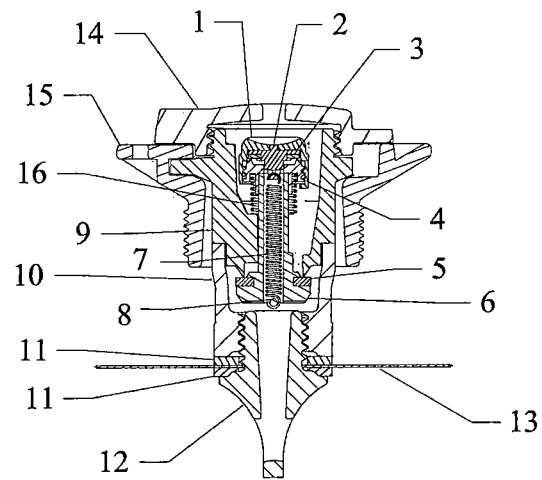
FIG. 13 provides a side sectional schematic view through Line 3-3 from FIG. 12 with individual parts labeled 1 through 16.
Figure 14:
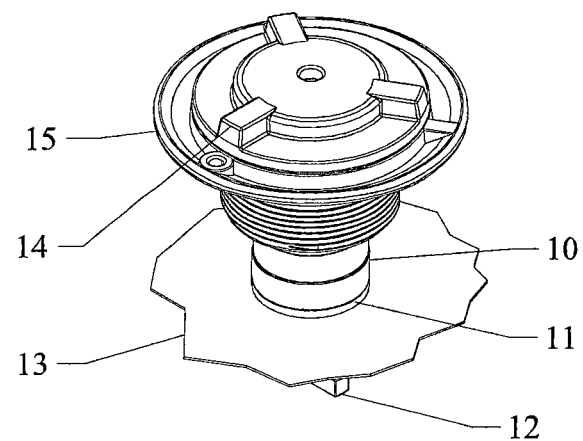
FIG. 14 provides an upper isometric view of valve system assembly from FIGS. 12 and 13.
Figure 17:
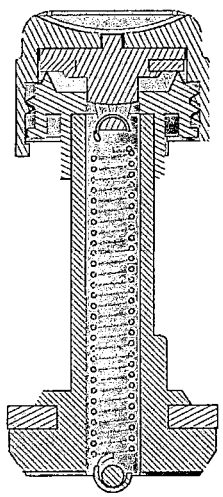
FIG. 17 provides a side sectional schematic view of PR Valve Assembly from FIGS. 6 through 11.
Figure 18:
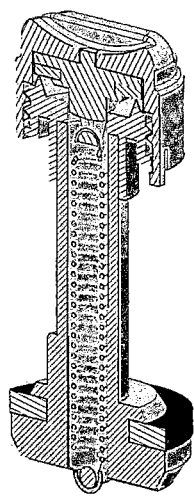
FIG. 18 provides a isometric sectional view of PR Valve Assembly from FIGS. 6 through 11.
Figure 19:
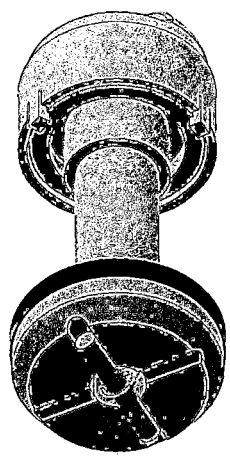
FIG. 19 provides a lower isometric view of PR Valve Assembly from FIGS. 6 through 11
Figure 20:
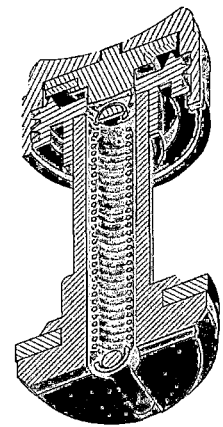
FIG. 20 provides a lower isometric sectional view of PR Valve Assembly from FIGS. 6 through 11.
Figure 21:
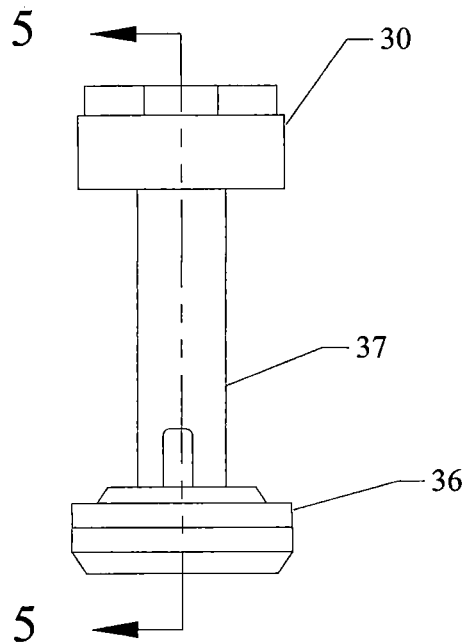
FIG. 21 provides a side view of Compression Pressure Relief Valve Assembly.
Figure 22:
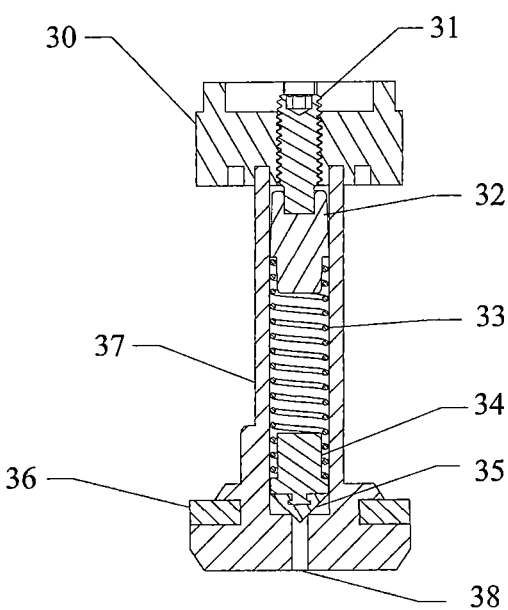
FIG. 22 provides a schematic sectional view showing another embodiment of this invention including both inflation air valve and pressure release valve with individual parts labeled 30 through 37.
Figure 23:
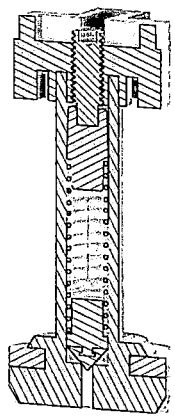
FIG. 23 provides a isometric sectional view of Pressure Relief Compression Valve Assembly from FIGS. 21 and 22.
Figures 24, 25:
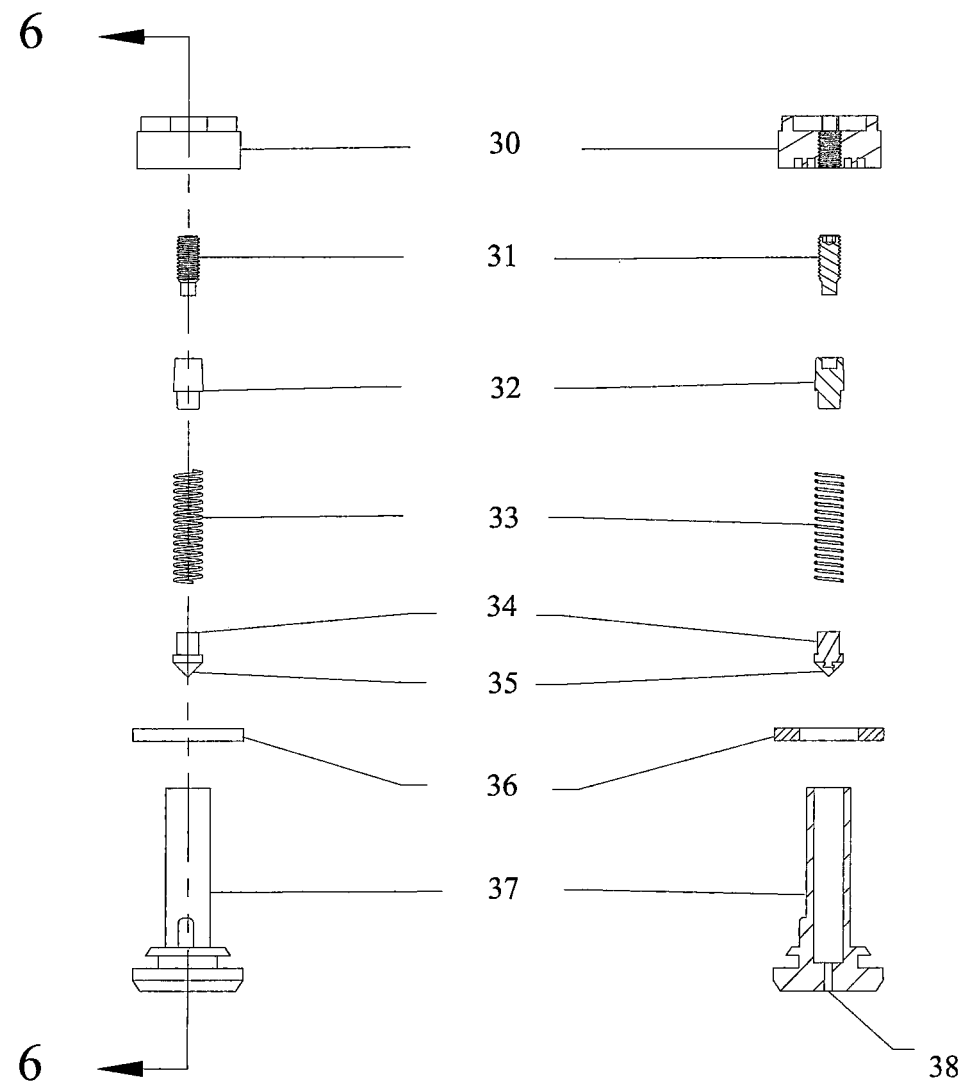
FIG. 24 provides a schematic side view showing the embodiments of the PR Valve Assembly from FIGS. 21 through 23 with individual parts labeled 30 through 37.
FIG. 25 provides a schematic side sectional view showing the embodiments of the PR Valve Assembly from FIG. 24 with individual parts labeled 30 through 37.

The air valve Main Body 6 must be inserted into an embodiment of Main Body 9 shown in FIG. 13, Then installation of the Spring 16 will allow the Upper Valve Body 4 to then be ultrasonically welded or glued to Main Body 6. This air valve assembly then facilitates the internal air holding of the inflatable boat or article. Even though shown being installed in only one embodiment of Main Body 9 and using Spring 16, this does not preclude using this newly invented pressure relief system in other similar type air valve assemblies.

Following this procedure the Valve Body 2 with attached Elastomer Washer 3 and Spring 7 can be inserted into Main Body 6. After the Spring 7 is extended by any means the SS Pin 8 may then be placed in the bottom of Main Body 6. The different height adjustments 27 and 28 in Main Body 6 allow for the adjustment of spring force using the individual slots for SS Pin 8. This force is directly related to pressure release point, which can also be varied by the diameter of inverted V feature 23 on Upper Valve Body 4. Once assembled the SS Pin 8 should then be solidly attached to Main Body 6 with an adhesive or glue.

After the placement of interior parts just mentioned, the Cap 1 may then be threaded on and attached to the Upper Valve Body 4. Shown in FIG. 16 are multiple tabs 19 on Cap 1 which along with the locking ring 25 on the Upper Valve Body 4 will facilitate the embodiment to lock the Cap 1 to the Upper Valve Body 4 once threaded on and attached. These features allow user control of the pressure relief function without the worry of the Cap 1 becoming loosened until it is no longer attached to the Upper Valve Body 4 with the risk of loss thereafter.

The invention of these embodiments allow both a visual indication relating to the setting of Pressure Relief Valve system and also a way to turn off the pressure relief function temporarily if desired during high speed and/or extreme conditions. The knob on Valve Body 2 along with the hole 18 in Cap 1 allow for a quick and simple visual indication of the pressure relief function setting. A high visibility paint, coating, or different color plastic around the inside of hole 18 in Cap 1 would provide a superior indicator of the setting of pressure relief function. This contrasting color inside the hole 18 would be very noticeable once the indicator knob 29 on Valve Body 2 is removed from view by the loosening of Cap 1 threaded and locked on to Upper Valve Body 4. If desired the tightening of Cap 1 on the Upper Valve Body 4 would turn off the pressure relief function by holding fast the Valve Body 2 to the Upper Valve Body 4 through the Valve Body Elastomer Washer 3. This tightening of Cap 1 would not allow the valve Body 4 to move and release air/gas, even in a over pressure environment inside the inflatable sections of boat or article.

FIGS. 21 through 25 show another embodiment of combined inflation air valve and internally mounted pressure relief valve. Whereas the previous embodiment uses an Extension Spring in tension for the sealing force, this embodiment uses a compression spring to accomplish the needed force.

This embodiment of invention incorporates a poppet needle valve for the pressure relief function, which is best described as a self-guided actuated check valve. This Poppet Valve 34 and attached Rubber Tip 35 is shaped to allow a Compression Spring 33 to exert the needed force to hold the poppet valve shut and air-tight at normal operating internal air pressure. This embodiment of pressure relief valve also consists of Cap 30 that may then be ultrasonically welded to the Main Body 37 after installing all interior parts of combination air and pressure relief valve. This Cap 30 has a threaded hole at the top, which allows an appropriate Adjustment Screw 31 to be threaded into the Cap 30 to allow adjustment of the release pressure set point. Between this Adjustment Screw 31 and the Spring 33 is an Upper Spacer Body 35 which allows the transfer of force between the Adjustment Screw 31 and Spring 33.

Once a particular embodiment and the individual parts are installed inside and held secure by the Cap 30, the adjustment of Adjustment Screw 31 will allow a range of pressure relief set point for any individual embodiment whichever variables of Spring 33 force in relation to the diameter of hole 38 are selected. These are the three variables which allow a wide range of relief pressures by selecting the force provided by Compression Spring 33 in relation to the area of the hole 38 and adjustment of the Screw 33. If these three variables in a particular embodiment do not meet the parameters in a chosen design, the height/length of the Upper Spacer Body 32 may be varied for another embodiment with different pressure relief point setting without having to change the selected Spring 33 or diameter of hole 38.

By varying diameter of the inverted V shape 23 on the Valve Body 2 or the hole 38 at the bottom of air valve 37 will allow the varying of pressure relief set point. The two variables of force provided by either pressure relief Spring 7 or Spring 33 and the diameter of inverted V shape 23 or hole 38 allows for many embodiments of this new and novel invention.

There are other ways to accomplish these same embodiments with a differing design and/or shape of the elements, but however designed the accomplished results are the same. To allow the controlled release of air inside the boat or article when needed due to overpressure for any reason using only one valve assembly and/or body in place of two separate individual valves and/or bodies.

PARTS AND FEATURES LIST

1) PR TNS VALVE Cap
2) PR TNS VALVE Valve Body
3) PR TNS VALVE Valve Body Elastomer Washer
4) PR TNS VALVE Upper Valve Body
5) PR TNS VALVE Main Body Elastomer Washer
6) PR TNS VALVE Main Body
7) PR TNS VALVE Extension Spring
8) PR TNS VALVE Stainless Steel Round Pin
9) Main Body
10) Lower Body
11) Thumb Screw Elastomer Washer
12) Thumb Screw
13) Bag/Bladder
14) Main Body Cap
15) Adapter
16) Main Body Air Valve Spring
17) Slot in Cap 1 for Coin or Flathead Screwdriver
18) Hole in Cap 1 for indicator from Valve Body 2
19) Tabs in Cap 1 to lock Cap 1 to Upper valve Body 4
20) Indicator knob on Valve Body 2 for visual reference of pressure relief valve setting.
21) Slot in Valve Body 2 to contain Elastomer Washer 3
22) Slot in Valve Body 2 for Extension Spring 7
23) V shaped feature for air seal between Upper Valve body 4 and Valve Body 2 including installed Valve Body Elastomer Washer 3
24) Slot in Upper Valve Body 4 for Main Body Air Valve Spring 16
25) Circular Feature on Upper Valve Body 4 allowing lock to Cap 1
26) Slot in Main Body 6 to contain Elastomer Washer 5
27) Upper Slot adjustment in Main Body 6 to hold SS Round Pin 8
28) Lower Slot adjustment in Main Body 6 to hold SS Round Pin 8
29) Bump on Main Body 6 and 36 so it will remain open for removal of air for storage or stowage
30) PR COM VALVE Cap
31) PR COM VALVE Adjustment Screw
32) PR COM VALVE Upper Spacer Body
33) PR COM VALVE Compression Spring
34) PR COM VALVE Poppet Valve
35) PR COM VALVE Poppet Valve Rubber Tip Seal
36) PR COM VALVE Main Body Elastomer Washer
37) PR COM VALVE Main Body
38) Hole in Main Body In view of the foregoing, it should be clear that numerous changes and variations can be made without exceeding the scope of the inventive concept outlined. Accordingly, it is to be understood that the embodiment(s) of the invention herein described is/are merely illustrative of the application and the principles of the invention. Reference herein to details of the illustrated embodiment(s) is not intended to limit the scope of the claims, which recite those features regarded as essential to the invention.

The invention claimed is:

1. An apparatus for an inflatable device comprising:
   an outer housing having an upper valve body portion, a lower valve body portion, a first central channel, and a first valve seat;
   a valve main body positioned within the first central channel and having a second central channel, wherein the valve main body further comprises a first valve head at a first end and a second valve seat at a second end;
   a compression spring positioned within the first central channel which biases the first valve head toward the first valve seat to form a first selectively dosed valve;
   an extension spring positioned within the second central channel which biases a second valve head toward the second valve seat to form a second selectively dosed valve; and
   wherein the apparatus is automatically activated by air pressure through the first and second channels, and/or the first valve head in cooperation with the first valve seat forms an inflation valve and the second valve head in cooperation with the second valve seat forms a relief valve.

2. The apparatus of claim 1, wherein said relief valve is activated by air pressure within said inflatable device activating said relief valve.

3. The apparatus of claim 1, further comprising a blocking member which prevents actuation of said relief valve when in a blocking position.

4. The apparatus of claim 2, further comprising a blocking member which prevents actuation of said relief valve when in a blocking position.

5. The apparatus of claim 1, wherein said compression spring and/or extension spring are formed by a coiled spring.

6. The apparatus of claim 1, wherein said extension spring is anchored proximate the inflation valve and attached to the relief valve.

7. The apparatus of claim 5, further comprising a blocking member which prevents actuation of said relief valve when in a blocking position.

8. The apparatus of claim 6, further comprising a blocking member which prevents actuation of said relief valve when in a blocking position, wherein the blocking member is a screw down cap.

* * * * *